United States Patent [19]

Hemmerich et al.

[11] 3,992,487

[45] Nov. 16, 1976

[54] DEGRADABLE PLASTICS COMPOSITIONS CONTAINING A TRANSITION METAL COMPLEXED WITH A 1,3-DICARBONYL GROUP CONTAINING POLYMER

[75] Inventors: Heinz-Peter Hemmerich; Hans Jürgen Rosenkranz; Hans Rudolph, all of Krefeld, Germany

[73] Assignee: Bayer Aktiengesellschaft, Germany

[22] Filed: Oct. 25, 1974

[21] Appl. No.: 517,962

[30] Foreign Application Priority Data
Oct. 31, 1973 Germany............................ 2354534
Oct. 31, 1973 Germany............................ 2354535

[52] U.S. Cl. .......................... 260/896; 260/63 UY; 260/66; 260/78.3 UA; 260/874; 260/897 R; 260/897 B; 260/DIG. 43; 526/351; 526/347; 526/12; 526/26

[51] Int. Cl.$^2$........................................... C08J 3/20

[58] Field of Search............ 260/DIG. 43, 80˙L, 66, 260/63, 78.3 UA, 874, 896, 897 R, 897 B

[56] References Cited
UNITED STATES PATENTS

| | | | |
|---|---|---|---|
| 3,520,843 | 7/1970 | Moody et al................... | 260/31.8 R |
| 3,676,401 | 7/1972 | Henry........................... | 260/DIG. 43 |
| 3,797,690 | 3/1974 | Taylor et al. ................ | 260/DIG. 43 |
| 3,880,952 | 4/1975 | Brackman.................... | 260/DIG. 43 |

FOREIGN PATENTS OR APPLICATIONS

| | | | |
|---|---|---|---|
| 2,136,704 | 1/1972 | Germany..................... | 260/DIG. 43 |

Primary Examiner—Eugene C. Rzucidlo
Attorney, Agent, or Firm—Connolly and Hutz

[57] ABSTRACT

Degradable polymers are obtained by either mixing a conventional thermoplastic polymer and a transition metal containing polymeric product in which the transition metal is bound in complex form through 1,3-dicarbonyl groups attached to the polymeric product or using the polymeric product as polymer alone. These polymers are degradable under the effect of natural weathering, ultraviolet rays and/or sunlight.

9 Claims, No Drawings

DEGRADABLE PLASTICS COMPOSITIONS CONTAINING A TRANSITION METAL COMPLEXED WITH A 1,3-DICARBONYL GROUP CONTAINING POLYMER

This invention relates to plastics compositions of thermoplastic plastics and polymers containing transition metals, to a process for their production and to their use as plastics which can be degraded under the influence of ultraviolet rays and/or sunlight. Further objects are polymers containing transition metals, a process for their production and their use as plastics which can be degraded.

In recent years, the need for degradable plastics has been given increasing emphasis in discussions on pollution problems. It appears extremely desirable to produce disposable, rottable plastics articles for certain applications, for example packaging material, drinking beakers, etc., which cannot always be dumped or incinerated in the required manner.

It is known that polyolefins or other plastics can be made photodegradable by the addition of certain additives. Such additives are disclosed, for example, in German Offenlegungsschrift No. 2,136,704. If articles or sheets of these plastics are exposed to natural weathering, they disintegrate more or less quickly under the effect of sunlight into small particles which can then be biologically degraded by microorangisms.

The additives used are low molecular weight components which are merely dissolved in the polymers and, hence, can be extracted therefrom. The photodegradability of the polymerrs can be completely or partly lost as a result of extraction of the additives. In addition, unforeseeable problems can arise in cases where plastics made photodegradable with additives are used for packaging foodstuffs. Additives migrating into the foodstuffs can adversely affect both their smell and their flavour. Toxicological problems require particularly thorough investigation and can make it difficult or impossible to use additives of this kind for plastics used in the foodstuffs industry.

Although it is stated in German Offenlegungsschrift No. 2,136,704 that the complex-forming groups can form part of a polymer chain, there is no corresponding teaching with respect to technical procedure, because the polymer not only has to be capable of forming complexes, it also has to be uniformly compatible with the plastics to be made degradable.

Another method of producing photodegradable plastics is described, for example, in German Offenelgungsschrift No. 2,206,806 and results in the incorporation of photosensitive groups in the corresponding polymer. Although the disadvantages typical of low molecular weight additives do not arise in this case, it is necessary, if photodegradability is to be obtained by incorporating reactive groups in the polymer, to modify the polymer while the plastics material is actually being produced by incorporating therein special comonomers containing photosensitive groups. Thus, this procedure complicates production of the plastics material to be made degradable. Furthermore, the process cannot be generally applied, rather is it necessary to determine from one case to another whether the required monomers can in fact be copolymerised at all.

The object of the present invention is to provide plastics compositions of thermoplastic plastics and polymers containing transition metals or polymers containing transition metals to develop a process for their production and to enable these compositions to be used as degradable plastics.

Plastics compositions of this kind combine the advantages of plastics made degradable with additivies (subsequent incorporation of the additives) with the advantages of copolymerised, photosensitive groups (no migration problems).

Accordingly, the invention provides plastics compositions which consist of a conventional thermoplastic plastic (A) and a transition metal-containing polymeric compound (B) or compound (B) alone which contains the transition metal bound in complex form through 1,3-dicarbonyl groups attached to the polymer.

The invention also relates to a process for producing plastics compositions of this kind and to their use as degradable plastics.

The transition metal is preferably bound in complex form in the transition-metal-containing polymeric compound (component B) in a quantity of from 0.1 ppm to 6% by weight and preferably in a quantity of from 10 ppm to 3% by weight, based on the weight of component B.

The transition-metal-containing polymers (B) are preferably added to conventional thermoplastic plastics (A) in such quantities that transition-metal-containing mixtures with a metal content of from 0.1 to 25,000 ppm, preferably from 1 to 1000 ppm, are formed.

In the context of the invention, transition metals are the elements of the Fourth Period with ordinal numbers from 21 to 30, the elements of the Fifth Period with ordinal numbers from 39 to 48 and the elements of the Sixth Period with ordinal numbers from 57 to 79. It is preferred to use iron, cobalt, nickel, manganese, chromium, copper and zinc, iron being particularly preferred.

The polymeric compounds (B) are macromolecular substances as defined by H. Staudinger, "Organische Kolloidchemie", F. Vieweg u. Sohn, Braunschweig, 1950, 3rd Edition, i.e. compounds containing 1000 or more atoms in the molecule.

The concept of the complex, especially that of the transition metal complex with organic ligands, is generally known and requires no explanation other than that the transition metal is non-ionically bound and is part of an at least four-membered, and generally six-membered or seven-membered ring formed from one or more complex-forming groups and the transition metal, cf. F. Hein, "Chemische Koordinationslehre", S. Hirzel Verlag, Leipzig, 1950 and A. E. Martell, M. Calvin, "Die Chemie der Metallchelat-Verbindungen", Verlag Chemie, Weinheim/Bergstrasse, 1958.

Polymeric systems suitable for component (B) are any polymeric compounds containing 1,3-dicarbonyl groups.

These 1,3-dicarbonyl groups are obtained for example by reacting diketene with aliphatic and phenolic hydroxyl or mercapto groups, with aliphatic or aromatic primary or secondary amino groups, with acid hydrazide groups, with acid amide groups, with acetals and with aromatic ring systems.

The polymers containing 1,3-dicarbonyl groups can be obtained both by reacting the polymers containing the aforementioned functional groups with diketene and by reacting monomers containing corresponding functional groups with diketene, followed by polymerisation. In the latter case, monomers without any 1,3- dicarbonyl groups can, of course, be used as comonomers for polymerisation.

In the former method, the reaction of polystyrene with diketene, for example in solution in trichlorethylene and in the presence of Lewis acid, results in the formation of an acetoacetylated polystyrene. The reaction of acetals of polyvinyl alcohols, such as polyvinyl butyral, with diketene also gives polymers with 1,3-dicarbonyl groups. Polymers containing acid hydrazide groups are formed for example by reacting styrene-maleic acid anhydride copolymers with hydrazine in accordance with U.S. Pat. No. 3,679,640. Further reaction with diketene subsequently results in the formation of polymers containing 1,3-dicarbonyl groups. Polymers containing acid amide groups are formed, for example, by the homopolymerisation or copolymerisation of (meth)acrylamide. Further reaction with diketene subsequently produces polymers containing 1,3-dicarbonyl groups. Aceto-acetylated polymers are obtained from diketene and polymers with primary and/or secondary amino groups, for example certain aminoplasts such as melamine-formaldehyde condensates. Polymers with mercapto groups, for example the reaction products of polymers containing hydroxyl groups, such as polyvinyl alcohols and mercapto carboxylic acids, such as mercapto acetic acid, or the reaction products of polymers containing carboxyl groups, such as polyacrylic or polymethacrylic acid and mercapto alcohols, such as 2-mercaptoethanol, give polymers containing 1,3-dicarbonyl groups by reaction with diketene. Finally, polymers containing 1,3-dicarbonyl groups can be obtained from any polymers containing hydroxyl groups, such as polyvinyl alcohols or certain phenol-formaldehyde condensates, by reaction with diketene.

Reaction of the above polymers with diketene is carried out in a solvent which is inert with respect to diketene. Examples of solvents of this kind are chlorinated hydrocarbons, such as methylene chloride and chloroform, aromatic hydrocarbons such as toluene, also dioxan, dimethylformamide, methylethyl ketone. A solvent which dissolves the polymer to be reacted with diketene is generally used, so that on completion of the reaction the polymer containing 1,3-dicarbonyl groups can be precipitated, for example in methanol. It is also possible, however, to use a solvent which does not dissolve the polymer to be reacted with diketene, the reaction naturally taking place for the most part only in a thin surface layer of the polymer particles. In this case there is no need for precipitation.

The reactions with diketene can be catalysed with acid or basic catalysts, for example with tertiary amines. The reaction temperatures are preferably in the range from 15° to 140° C, the reaction times fluctuating between 30 minutes and 24 hours.

In addition, polymers containing 1,3-dicarbonyl groups can be obtained by homopolymerising monomers containing 1,3-dicarbonyl groups or by copolymerising monomers of this kind with other suitable monomers. Monomers containing 1,3-dicarbonyl groups are, for example, vinyl and allyl acetoacetic ester, also diketene-acetoacetylated hydroxy propyl (meth)acrylate, hydroxyethyl(meth)acrylate and N-methylol (meth)acrylamide. Examples of suitable comonomers are alkyl and/or aryl olefins, such as ethylene, propylene and/or styrene and α-methyl styrene, acrylic acid, methacrylic acid, acrylates, methacrylates, acrylonitrile, methacrylonitrile, acrylamide, methacrylamide, vinyl esters such as vinylacetate, maleic acid anhydride and vinyl chloride.

The above method is described by way of example in the following with reference to the reaction of hydroxypropyl (meth)acrylate with diketene, followed by copolymerisation with styrene. Any expert can apply this particular system to the other monomers containing 1,3-dicarbonyl groups referred to above.

Hydroxypropyl(meth)acrylate is acetoacetylated by the addition of diketene with stirring. The reaction can be carried out in the presence of a tertiary amine catalyst at temperatures in the range from 15° to 80° C. There is no need to use a solvent. Homopolymerisation or copolymerisation into polymers containing 1,3-dicarbonyl groups can be carried out by any of the conventional methods for homopolymerising or copolymerising monomers. For example, acetoacetylated hydroxypropyl(meth)acrylate can be copolymerised with styrene by initially introducing the first component in toluene and adding the styrene, in which a polymerisation catalyst, such as dibenzoylperoxide is dissolved, at a temperature of 110° C. After a few hours, the polymer containing 1.3-dicarbonyl groups is precipitated in methanol.

In addition, polymers containing 1,3-dicarbonyl groups can be obtained by transesterifying polymers containing hydroxyl groups with acetoacetic esters, such as acetoacetic acid ethyl ester. Transesterification can also be carried out with monomers containing hydroxyl groups, such as hydroxypropyl(meth)acrylate, hydroxyethyl(meth)acrylate, N-methylol (meth)acrylamide. Subsequent homopolymerisation or copolymerisation with suitable comonomers of the kind referred to above, which should not contain any 1,3-dicarbonyl groups, also results in the formation of polymers containing 1,3-dicarbonyl groups. The transesterification stage can be accelerated by titanium tetrabutanolate or acid catalysts. Other transesterification catalysts are well known to the expert.

Polymers suitable for component (B) are any polymers containing 1,3-dicarbonyl groups, as explained in the preceding paragraphs. The nature of the residual molecule is of no importance. If, for example, the polymer used is a polymer containing hydroxyl groups, by no means all the hydroxyl groups have to be reacted with diketene to form 1,3-dicarbonyl groups. The distribution of the 1,3-dicarbonyl groups along the polymer chain is arbitrary. It can be statistical, as possible for example in a copolymer, or nonstatistical, as, for example, in a block polymer of a monomer containing 1,3-dicarbonyl groups and one of the suitable comonomers referred to above which does not contain any 1,3-dicarbonyl groups. However, the nature of the residual molecule should be such that the polymer containing 1,3-dicarbonyl groups is compatible with the thermoplastic plastic to be made degradable.

The polymers containing 1,3-dicarbonyl groups described above are reacted with transition metal compounds to form transition-metal-containing polymers which contain the transition metal bound in complex form in a quantity of from 0.1 ppm to 6% by weight, preferably in a quantity of from 10 ppm to 3% by weight, based on the polymer. The reactions can be carried out at temperatures in a wide range, for example at temperatures of from −50° C to +150° C either in suspension or in solution, and are over within 5 minutes to 6 hours. An expert can select an appropriate suspending agent or solvent. The type of procedure adopted does not have any bearing upon the properties of the product in regard to its degradability. However, the reaction conditions applied can differ widely, depending upon the polymer containing 1,3-dicarbonyl groups used.

For example, a polyethylene containing 1,3-dicarbonyl groups is suspended in a non-solvent, the required transition metal compound added and the transition-metal-containing polymer isolated after a few hours.

In another case, a copolymer is prepared by the solution polymerisation of a monomer containing 1,3-dicarbonyl groups with styrene, being reacted in dissolved form with the required transition metal compound. The reaction is carried out by mixing the components. The transition-metal-containing polymer is ultimately obtained by precipitation, for example in methanol.

However, complex formation can also be carried out in the plastics composition according to the invention by working the polymer containing 1,3-dicarbonyl groups and the transition metal compound into the thermoplastic plastics either simultaneously or successively, for example by extrusion.

One typical embodiment of the process, in which the prepared transition-metal-containing polymer (component B) is worked into the thermoplastic plastic, i.e. in which complex formation has taken place before the polymer is incorporated, is carried out as follows:

A polymer containing acetoacetic ester groups obtained as just described is suspended in the form of fine particles in a solvent in which the polymer is insoluble, for example in an alcohol, such as ethanol, or in water or in a water-alcohol mixture, followed by addition of the required quantity of a transition metal compound, for example $FeCl_3$. The resulting product, which is now red in colour as a result of complex formation, is extruded for example together with polyethylene.

One typical embodiment of the process in which the formation of component B, i.e. complex formation between the polymer containing 1,3-dicarbonyl groups and the transition metal compound, only takes place during incorporation into the thermoplastic plastic, is carried out as follows:

A polymer containing acetoacetic ester groups obtained as just described is extruded for example, together with polyethylene, so that a product containing about $10^{-3}$ to $10^{-1}$ mols of acetoacetic ester groups per 100 g of product is obtained. The required quantity of a suitable transition metal compound is worked in at the same time or afterwards either by extrusion or by compounding.

The following inorganic salts of the already defined transition metals are mentioned as examples of suitable transition metal compounds: chlorides, bromides, sulphates and/or nitrates. Suitable organic compounds of these transition metals are, for example, the salts of monofunctional and polyfunctional carboxylic acids such as acetates, octoates, palmitates, stearates, oleates, naphthenates, oxalates, such as $K_3Fe(C_2O_4)_3$, tartrates and citrates, also acetylacetonates, acetoacetates, such as ethyl or dodecyl acetoacetates, N,N-dialkyl dithiocarbamates and/or dialkyl dithiophosphates. It is preferred to use the respective iron, cobalt, nickel, manganese, chromium, copper and/or zinc compounds, and particularly preferred to use iron chloride, iron stearate, iron ethyl acetoacetate, iron acetylacetonate and/or iron naphthenate. The transition-metal-containing polymeric compounds (B) may be used as resins being degradable, they may also be used as additives to conventional thermoplastic plastics (A) which are thereby made degradable.

Suitable thermoplastic plastics (A) include any conventional thermoplasts, for example, homopolymers and/or copolymers of α-olefins and/or styrene. It is preferred to use polyethylene, polypropylene and polystyrene.

The compositions containing transition metals, preferably iron, represent degradable plastics which can be degraded depending upon their metal content, under the effect of natural weathering, and more especially under the effect of ultraviolet rays and/or sunlight, whereas they are not affected to any appreciable extent by sunlight filtered through window glass approximately 3 mm thick.

The mixtures consisting of the transition-metal-containing polymer (B) and the conventional thermoplastic plastic (A) can be prepared by the master-batch method. A master-batch with a transition metal content of from 1 ppm to 6% by weight, preferably from 100 ppm to 5% by weight, is initially prepared. The master-batch consists of a conventional thermoplastic plastic and the required quantity of the transition-metal-containing polymeric compound, and is obtained for example by the co-extrusion of the conventional thermoplast and a transition-metal-containing polymer, or by the co-extrusion of the conventional thermoplast, a polymer containing 1,3-dicarbonyl groups and a suitable transition metal compound. In order to obtain the desired product, the master-batch is co-extruded or compounded with the requisite quantity (i.e. for the required metal content) of the thermoplast already used in the production of the master-batch or of a thermoplast homogeneously compatible with the master-batch. In general, it is even possible to make plastics alloys degradable. In the production of the master-batch and in the production of the degradable plastics compositions, it is possible to use one or even several of the transition-metal-containing polymers or transition metal compounds according to the invention, so that degradable plastics compositions optionally containing more than one transition metal are ultimately obtained.

Incorporation of the transition-metal-containing polymers (component B) respectively and incorporation of the polymers containing 1,3-dicarbonyl groups and the transition metal compounds into the particular thermoplast used for preparing a transition-metal-containing master-batch or a transition-metal-containing plastics composition according to the invention, is carried out by homogeneous mixing, for example by extrusion, compounding or rolling, in the machines normally used for this purpose under the conditions conventionally applied in the case of the particular thermoplast used. Thus, mixing is carried out at temperatures in the range from 100° to 350° C for periods ranging from 1 minute to 30 minutes.

If one of the aforementioned transition metal compounds is worked into the particular thermoplast used together with or after the polymer containing 1,3-dicarbonyl groups, the compound can be incorporated both in the form of a pure substance and also in the form of a solution. In the second case, the solvent is generally removed from the plastics composition during incorporation on account of the high processing temperatures. An extruder with a venting zone can be used with advantage for this purpose.

From 0.1 to 5.0% by weight of other substances promoting photodegradation of the kind described, for example, in German Offenlegungsschrift No. 2,133,896, i.e. benzophenones, such as benzophenone, aryl alkyl ketones, such as acetophenone and propiophenone, anthraquinones,, fluorenones and/or xanthones, may optionally be added to the polymers according to the invention.

The plastics compositions according to the invention can contain the usual additives such as blowing agents, pigments or fillers, antistatics, lubricants or other auxiliaries. Like any thermoplasts, they can be processed by the usual methods in the usual machines to form mouldings, sheeting, filaments or fibres.

The invention is illustrated by but by no means limited to the following Examples:

EXAMPLE 1

200 g of an approximately 97% hydrolysed copolymer of ethylene and vinyl acetate (m.p. 100° – 112° C) with an OH-content of about 7% were dissolved in chloroform and the resulting solution reacted with 70 g of diketene at a temperature of 60° C. The reaction mixture was then stirred for another 2 hours at 60° C. The product was then precipitated in methanol. The polymer (m.p. 100° – 115° C, glass transition temperature 41° – 42° C) accumulated in the form of a fine white powder in a substantially quantitative yield (more than 95%).

EXAMPLE 2

200 g of the hydrolysed ethylene-vinyl acetate copolymer mentioned in Example 1 were dissolved in chloroform and the resulting solution reacted at 60° C with 73 g of mercapto acetic acid. The reaction took place in a water separator and was catalysed with p-toluene sulphonic acid. On completion of the reaction, the catalyst was neutralised with sodium bicarbonate and separated off. Without further working up, the product was reacted with 66 g of diketene in chloroform at a temperature of 60° C. The reaction mixture was then stirred for 2 hours at 60° C and subsequently precipitated in methanol. The polymer accumulated in a yield of about 75%, based on the copolymer used, in the form of a fine white powder melting at 80° to 101° C.

EXAMPLE 3

52 g of polystyrene were dissolved at 40° C in 1,2-dichloroethane and the resulting solution was reacted at that temperature with 21 g of diketene in the presence of AlCl$_3$. The reaction mixture was stirred for 4 hours at 40° C and then poured on to ice/hydrochloric acid. The product was converted into a crystalline readily separable form by the addition of methanol. The polymer accumulated in the form of a yellow powder (m.p. 140° – 145° C).

EXAMPLE 4

1 g of triethylamine was added to 144 g of hydroxy propyl methacrylate. 84 g of diketene were then added dropwise with stirring at a temperature of 55° C, followed by stirring for 1 hour at that temperature. 23 g of this reaction product of hydroxy propyl methacrylate with diketene were introduced into toluene. 104 g of styrene, in which 3.5 g of dibenzoyl peroxide were dissolved were then added dropwise over a period of 1 hour at 110° C. The solution was then stirred for 4 hours at that temperature and subsequently precipitated in methanol. A white polymer powder (m.p. 120° – 140° C) was obtained in a yield of approximately 90%.

EXAMPLE 5

23 g of the reaction product of hydroxy propyl methacrylate with diketene, prepared in accordance with Example 4, were initially introduced into toluene. 100 g of methyl methacrylate in which 3.5 g of dibenzoyl peroxide had been dissolved were added dropwise over a period of 1 hour at 110° C. The reaction mixture was then stirred for another 3 hours at 110° C. and subsequently precipitated in methanol. The polymer accumulated in the form of a white powder melting at 141° to 159° C (yield approximately 95%).

EXAMPLE 6

11.5 g of the reaction product of hydroxy propyl methacrylate with diketene prepared in accordance with Example 4 were initially introduced into toluene. Another 103 g of this product, in which 3.5 g of dibenzoyl peroxide had been dissolved, were then added dropwise over a period of 1 hour at 110° C. The solution was stirred for another 3 hours at 110° C, and subsequently precipitated in methanol. A pale-yellow coloured polymer powder melting at 77° to 85° C was obtained in a yield of approximately 80%.

EXAMPLE 7

200 g of the hydrolysed ethylene-vinyl acetate copolymer of Example 1 were dissolved in chloroform, and the resulting solution was transesterified at 60° C with 160 g of aceto-acetic acid ethyl ester in the presence of a catalytic quantity of p-toluene sulphonic acid. If the reaction is carried out in DMF or dioxan, ethanol can be continuously distilled off. In this case, only about 115 g of acetoacetic acid ethyl ester need be used. The polymer was isolated after precipitation in methanol (m.p. 100° – 113° C).

EXAMPLE 8

72 g of hydroxypropyl methacrylate were initially introduced into toluene and transesterified with 65 g of acetoacetic acid ethyl ester in the presence of a catalytic quantity of titanium tetrabutanolate. The ethanol formed was continuously distilled off. On completion of transesterification 520 g of styrene, in which 17.5 g of dibenzoyl peroxide had been dissolved, were added dropwise over a period of 3 hours at a temperature of 110° C. The reaction mixture was stirred for another 5 hours at 110° C and subsequently precipitated in methanol. The polymer accumulated in the form of a white powder (m.p. 115° – 140° C).

EXAMPLE 9

100 g batches of the polymer containing 1,3-dicarbonyl groups, prepared in accordance with Example 1, were suspended in ethanol, followed by the addition at room temperature of the required quantity of a transition metal compound. To this end, the transition metal compound was generally dissolved beforehand in a solvent, such as ethanol and/or water, and then added dropwise. The reaction mixtures were stirred for 30 minutes to 4 hours at room temperature. Finally, the transition-metal-containing polymer was isolated by filtration. The Table shows some of the products obtained by this process. Column 1 shows the transition metal compound used, column 2 the quantity in which it was used, column 3 the quantity of transition metal analytically determined in the polymer and column 4 the colour of the transition-metal-containing polymer.

Table 1

|   | Transition metal compound | Quantity used | Transition metal content of polymer (ppm) | Colour of the transition-metal-containing polymer |
|---|---|---|---|---|
| 1 | FeCl$_3$ | 0.15 g | 510 | red |
| 2 | FeCl$_3$ | 0.75 g | 2550 | red |
| 3 | Fe-stearate | 1.30 g | 800 | red |
| 4 | Fe-naphthenate | 3.00 g | 1780 | red |
| 5 | Fe-ethylaceto-acetate | 1.20 g | 1460 | red |
| 6 | Fe-acetyl-acetonate | 1.20 g | 1750 | red |
| 7 | Mn-stearate | 1.70 g | 1300 | white |
| 8 | Co-octoate | 2.00 g | 1100 | pink |
| 9 | CuCl$_2$ | 0.08 g | 350 | light green |
| 10 | CuCl$_2$ | 0.55 g | 2500 | light green |
| 11 | Cu-stearate | 3.90 g | 3800 | light green |
| 12 | Cu-oleate | 2.30 g | 2230 | light green |
| 13 | Cu-naphthenate | 2.00 g | 1520 | light green |
| 14 | NiCl$_2$ | 0.10 g | 380 | light green |

The Fe-naphthenate, Co-octoate and Cu-naphthenate were used in the form of solutions containing 6% by weight of Fe, 6% by weight of Co and 8% by weight of Cu, respectively.

EXAMPLE 10

100 g batches of the polymer containing 1,3-dicarbonyl groups prepared in accordance with Example 4 were reacted in toluene at 40° to 50° C with the requisite quantity of a transition metal compound. The solution was neutralised by introducing ammonia. The transition-metal-containing polymer was then precipitated in methanol. The products accumulated in the form of fine, generally coloured powders. The Table shows some of the products obtained by this process.

Table 2

|   | Transition metal | Quantity used | Transition metal content of polymer (ppm) | Colour of the transition-metal-containing polymer |
|---|---|---|---|---|
| 1 | FeCl$_3$ | 8.5 g | 19500 | red |
| 2 | FeCl$_3$ | 2.0 g | 6200 | red |
| 3 | Fe-stearate | 1.6 g | 900 | red |
| 4 | Mn-stearate | 1.0 g | 820 | white |
| 5 | CuCl$_2$ | 0.5 g | 2100 | light green |
| 6 | Cu-oleate | 3.0 g | 2950 | light green |
| 7 | [Cr(H$_2$O)$_6$]Cl$_3$ | 1.0 g | 1750 | light green |
| 8 | ZnCl$_2$ | 0.5 g | 2100 | white |

EXAMPLE 11

The transition-metal-containing polymers prepared in accordance with Example 9 were worked in the following quantities into polyethylene (Bayer's Baylon V 22 H 864), so that in each case the mixture as a whole weighed 100 g: 9.8 g of the iron-containing polymer (Table 1, line 1), 0.77 g of the manganese-containing polymer (Table 1, line 7), 2.72 g of the cobalt-containing polymer (Table 1, line 8), 1.33 g of the copper-containing polymer (Table 1, line 13), 2.63 g of the nickel-containing polymer (Table 1, line 14).

Approximately 0.1 mm thick sheets were produced from the products thus obtained and then artificially weathered in a xenon test (Atlas Weather-Ometer, 600 Watt lamp, spraying cycle 102 : 18). At the same time, a sheet of conventional polyethylene, i.e. of Baylon V 22 H 864 without any addition of a transition-metal-containing polymer, was similarly tested in a comparison test.

Degradation was determined by assessing the appearance of the surface of the films and by measuring the time which elapsed before vigorous bending through 2 × 180° resulted in breakage of the sheets.

The results of the xenon test are set out in Table 3.

Table 3

| Test | Transition metal content (ppm) | Darkening of the surface (after days) | Irradiation time elapsing before breakage of the sheet by double bending (days) |
|---|---|---|---|
| 1 | 50 Fe | 8.5 | 12 |
| 2 | 10 Mn | 22 | 30 |
| 3 | 30 Cu | 17 | 25 |
| 4 | 20 Cu | 22 | 31 |
| 5 | 10 Ni | 30 | 45 |
| Comparison test | | no visible changes throughout the entire duration of the test | |

EXAMPLE 12

5 g of the metal-free acetoacetylated copolymer prepared in accordance with Example 1 were incorporated by extrusion into 95 g of polyethylene (Bayer's Baylon V 22 H 864). 0.8 g of iron acetoacetic ester were then worked in. A master-batch containing 0.1% of iron was obtained. Coextrusion of 200 g, 100 g, 50 g, 10 g of the master-batch with 800 g, 900 g, 950 g, 990 g of polyethylene produced 1000 g batches of polyethylene with iron contents of 200, 100, 50 and 10 ppm. The results of the xenon test are set out in Table 4.

EXAMPLE 13

5 g of the metal-free acetoacetylated copolymer produced in accordance with Example 1 were incorporated by extrusion together with 0.8 g of iron acetoacetic ester into 95 g of polyethylene (Bayer's Baylon V 22 H 864). A master-batch containing 0.1% of iron was obtained. The coextrusion of 200 g, 100 g. 50 g and 10 g of this master-batch with 800 g, 900 g, 950 g, 990 g of polyethylene produced 1000 g batches of polyethylene containing 200, 100, 50 and 10 ppm of iron. The results of the xenon test are set out in Table 4.

EXAMPLE 14

The 0.8 g of iron acetoacetic ester in Example 12 were replaced by 1.62 g of iron stearate. The results of the xenon test are set out in Table 4.

EXAMPLE 15

The 0.8 g of iron acetoacetic ester in Example 13 were replaced by 1.62 g of iron stearate. The results of the xenon test are set out in Table 4.

Table 4

| Test | Iron content (ppm) | Darkening of the surface (after days) | Irradiation time elapsing before breakage of the sheets by double bending (days) |
|---|---|---|---|
| Ex. 12 | 200 | 3.5 | 5.5 |
|  | 100 | 6 | 8 |
|  | 50 | 9 | 13 |
|  | 10 | 14 | 24 |
| Ex. 13 | 200 | 3.5 | 5.5 |
|  | 100 | 6 | 8 |

Table 4-continued

| Test | Iron content (ppm) | Darkening of the surface (after days) | Irradiation time elapsing before breakage of the sheets by double bending (days) |
|---|---|---|---|
| | 50 | 9 | 13 |
| | 10 | 14 | 24 |
| Ex. 14 | 200 | 3 | 4.5 |
| | 100 | 4.5 | 6.5 |
| | 50 | 7 | 11 |
| | 10 | 11 | 22 |
| Ex. 15 | 200 | 3 | 4.5 |
| | 100 | 4.5 | 6.5 |
| | 50 | 7 | 11 |
| | 10 | 11 | 22 |
| Comparison test | 0 | no visible changes throughout the entire duration of the test | |

EXAMPLE 16

5 g of the metal-free acetoacetylated copolymer prepared in accordance with Example 1 were incorporated by extrusion into 85 g of polyethylene (Bayer's Baylon V 22 H 864). 1.62 g of iron stearate and 10 g of isopropyl benzophenone were worked in at the same time. A master-batch containing 0.1% of iron and 10% of isopropyl benzophenone was obtained. The co-extrusion of 100 g and 50 g of this master-batch with 900 g and 950 g of polyethylene produced 1000 g batches of polyethylene with iron and isopropyl benzophenone contents of 100 and 50 ppm and of 1.0 – 0.5%. The results of the xenon test are set out in Table 5.

Table 5

| Test | Iron content (ppm) | Isopropyl benzophenone content (%) | Darkening of the surface (after days) | Irradiation time elapsing before breakage of the sheet by double bending (days) |
|---|---|---|---|---|
| Ex. 16 | 100 | 1.0 | 3 | 5 |
| | 50 | 0.5 | 5.5 | 8 |
| Comparison test | — | — | no visible changes throughout the entire duration of the test | |

EXAMPLES 17 to 19

Polypropylene (Farbwerke Hoechst's Hostalen PPH 1050) was used instead of the polyethylene employed in Examples 11, 13 and 15. In other respects, Example 17 corresponds to Example 11, Example 18 to Example 13 and Example 19 to Example 15. The results of the xenon test are set out in Table 6.

Table 6

| Test | Iron content (ppm) | Darkening of the surface (after days) | Irradiation time elapsing before breakage of the sheet by double bending (days) |
|---|---|---|---|
| Ex. 17 | 50 | 8 | 10 |
| Ex. 18 | 200 | 3 | 4.5 |
| | 100 | 4.5 | 6.5 |
| | 50 | 9 | 11 |
| | 10 | 12 | 22 |
| Ex. 19 | 200 | 2.5 | 3.5 |
| | 100 | 3.5 | 5.5 |
| | 50 | 5.5 | 9 |
| | 10 | 10 | 17.5 |
| Comparison test | — | no visible changes throughout the entire duration of the test | |

EXAMPLE 20

5.13 g of the iron-containing polymer prepared in accordance with Example 10, Table 2, line 1, were incorporated by extrusion into 95 g of polystyrene (BASF's 143 E). A master-batch containing 0.1% of iron is obtained in this way. The co-extrusion of 100 g, 50 g, and 10 g of this master-batch with 900 g, 950 g and 990 g of polystyrene produced 1000 g batches of polystyrene containing 100, 50 and 10 ppm of iron. Approximately 0.1 mm thick sheets were produced from the products thus obtained and the sheets were subjected to artificial weathering in a xenon test (Atlas Weather-Ometer, 600 Watt lamp, spraying cycle 102 : 18). At the same time, a sheet of conventional polystyrene, i.e. of polystyrene 143 E without any additives, was similarly tested for the purposes of comparison. Degradation was determined by assessing the appearance of the surface of the films and by measuring the time elasping before the sheets could readily be disintegrated into small particles or into a powder by rubbing with the fingers (embrittlement). The results of the xenon test are set out in Table 7.

Table 7

| Test | Iron content (ppm) | Darkening of the surface (after days) | Irradiation time elapsing before sheet embrittlement (days) |
|---|---|---|---|
| Ex. 20 | 100 | 2.5 | 5.5 |
| | 50 | 5 | 7 |
| | 10 | 7.5 | 16.5 |
| Comparison test | — | no visible changes throughout the entire duration of the test | |

EXAMPLE 21

5 g of the iron-free copolymer described in Example 4 were incorporated by extrusion into 95 g of polystyrene (BASF's 143 E). 80 mg of iron acetoacetic ester were then worked in. A master-batch containing 100 ppm of iron was obtained. The co-extrusion of 500 g and 100 g of this master-batch with 500 g and 900 g of polystyrene produced 1000 g batches of polystyrene containing 50 and 10 ppm of iron. The results of the xenon test are set out in Table 8.

EXAMPLE 22

5 g of the iron-free copolymer described in Example 4 were incorporated by extrusion together with 80 mg of iron acetoacetic ester into 95 g of polystyrene (BASF's 143 E). A master-batch containing 100 ppm of iron was obtained. The co-extrusion of 500 g and 100 g of this master-batch with 500 g and 900 g of polystyrene produced 1000 g batches of polystyrene containing 50 and 10 ppm of iron. The results of the xenon test are set out in Table 8.

EXAMPLE 23

The 80 mg of iron acetoacetic ester in Example 21 were replaced by 162 mg of iron stearate. The results of the xenon test are set out in Table 8.

EXAMPLE 24

The 80 mg of iron acetoacetic ester in Example 22 were replaced by 162 mg of iron stearate. Table 8 shows the results of the xenon test.

Table 8

| Test | Iron content (ppm) | Darkening of the surface (after days) | Irradiation time elapsing before sheet embrittlement (days) |
|---|---|---|---|
| Ex. 21 | 50 | 5 | 10 |
|  | 10 | 10 | 17.5 |
| Ex. 22 | 50 | 5 | 10 |
|  | 10 | 10 | 17.5 |
| Ex. 23 | 50 | 5 | 8 |
|  | 10 | 7.5 | 16.5 |
| Ex. 24 | 50 | 5 | 8 |
|  | 10 | 7.5 | 16.5 |
| Comparison test | — | no visible changes throughout the entire test period | |

EXAMPLE 25

45 g of the polymer containing 1,3-dicarbonyl groups prepared in accordance with Example 3 were reacted with 4 g of $FeCl_3$. A brown-red powder containing 2.25 % of iron was obtained. 4.44 g of this powder were incorporated by extrusion into 95.5 g of polystyrene (BASF's 143 E). A master-batch containing 0.1 % of iron was obtained in this way. The co-extrusion of 100 g, 50 g and 10 g of this master batch with 900 g, 950 g and 990 g of polystyrene produced 1000 g batches of polystyrene containing 100, 50 and 10 ppm of iron. The results of the xenon test are set out in Table 9.

Table 9

| Test | Iron content (ppm) | Darkening of the surface (after days) | Irradiation time elapsing before sheet embrittlement (days) |
|---|---|---|---|
| Ex. 25 | 100 | 5 | 6.5 |
|  | 50 | 7.5 | 9 |
|  | 10 | 10 | 19 |
| Comparison Test | — | no visible changes throughout the entire duration of the test | |

EXAMPLE 26

Approximately 0.1 mm thick sheets were produced from transition-metal-containing polymers produced in the same way as described in Example 9, and were artificially weathered in a Xenon test (Atlas Weather-Ometer, 600 Watt lamp, spraying cycle 102 : 18). At the same time, a sheet of conventional polyethylene (Bayer's Baylon V 22 H 864) was similarly tested in a comparison test.

Degradation was determined by assessing the appearance of the surface of the films and by measuring the time which elapsed before vigorous bending through 2 × 180° resulted in breakage of the sheets.

Table 10 shows the transition metal content of the polymers converted into sheet form, and the behavior of the sheets in the Xenon test Table 10

|  | Transition metal content (ppm) |  | Darkening of the surface (after days) | Irradiation time elapsing before breakage of the sheet by double bending (after days) |
|---|---|---|---|---|
| 1 | 200 | Fe | 3 | 4.5 |
| 2 | 20 | Fe | 9 | 18 |
| 3 | 20 | Co | 12 | 27 |
| 4 | 10 | Mn | 20 | 33 |
| 5 | 10 | Cu | 25 | 38 |
| Comparison test | — |  | no visible changes throughout | |

Table 10-continued

| Transition metal content (ppm) | Darkening of the surface (after days) | Irradiation time elapsing before breakage of the sheet by double bending (after days) |
|---|---|---|
|  | the entire duration of the test | |

EXAMPLE 27

19.6 g of the iron containing polymer (iron content 510 ppm) prepared in accordance with Example 9, Table 1, line 1, were co-extruded with 80.4 g of polyethylene (Bayer's Baylon V 22 H 864). A light yellow-orange coloured master batch with an iron content of 100 ppm was obtained. Co-extrusion of 100 g of this master batch with 900 g of polyethylene ultimately produced 1000 g of polyethylene with an iron content of 10 ppm. The material was not coloured to any appreciable extent.

Approximately 0.1 mm thick sheets were produced from this product and were artificially weathered in a Xenon test (Atlas Weather-Ometer, 600 Watt lamp, spraying cycle 102 : 18).

Degradation was determined by assessing the appearance of the surface of the films and by measuring the time which elapsed before vigorous bending through 2 × 180° resulted in breakage of the sheets.

Table 11

| Iron content (ppm) | Darkening of the surface (after days) | Irradiation time elapsing before breakage of the sheet by double bending (days) |
|---|---|---|
| 10 | 10 | 21 |
| Comparison test — | no visible changes throughout the entire duration of the test | |

We claim:
1. A composition comprising a mixture of (A) a plastic selected from the group consisting of polyolefins and polystyrene and (B) a polymer containing 1,3-dicarbonyl groups complexed with a transition metal of an atomic number from 21 to 30, 39 to 48 or 59 to 79, said (B) containing said complexed transition metal in an amount of from 0.1 ppm to 6% by weight, based on the weight of (B), and being present in an amount to provide a composition having a transition metal content of from 0.1 to 25,000 ppm.

2. The composition of claim 1 wherein said transition metal is selected from the group consisting of iron, cobalt, nickel, manganese, chromium, copper and zinc.

3. The composition of claim 1 wherein said transition metal is iron.

4. The composition of claim 1 wherein said polymer containing 1,3-dicarbonyl groups is the reaction product of diketene and a polymer having an aliphatic or phenolic hydroxyl functional group, a mercapto functional group, an aliphatic or aromatic primary or secondary amino functional group, an acid hydrazide functional group, an acid amide functional group or an acetal functional group or polystyrene.

5. The composition of claim 1 wherein said polymer containing 1,3-dicarbonyl groups is the polymerized reaction product of diketene and a monomer having an aliphatic or phenolic hydroxyl functional group, a mercapto functional group, an aliphatic or aromatic primary or secondary amino functional group, an acid hydrazide functional group, an acid amide functional group or an acetal functional group or styrene.

6. The composition of claim 5 wherein at least one other polymerizable monomer has been copolymerized with said reaction product of diketene and the monomer having said functional group.

7. The composition of claim 1 wherein said polymer containing 1,3-dicarbonyl groups is the transesterification product of a polymer containing hydroxyl groups with an acetoacetic ester.

8. The composition of claim 1 wherein said polymer containing 1,3-dicarbonyl groups is the transesterification product of a monomer having a hydroxyl functional group and an acetoacetic ester which has been polymerized.

9. The composition of claim 8 wherein said transesterification product has been polymerized with at least one other comonomer.

* * * * *